(No Model.)
G. FREUND.
POCKET KNIFE.
No. 297,375. Patented Apr. 22, 1884.
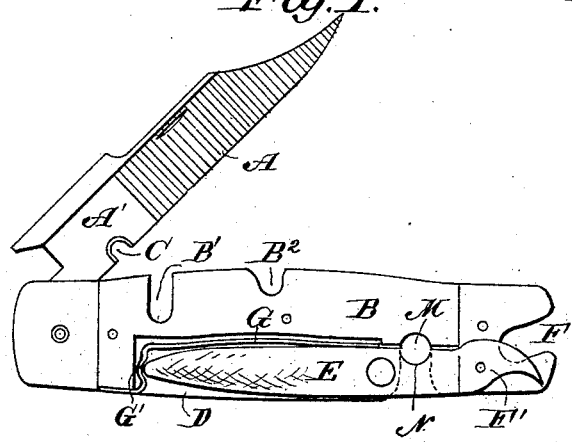
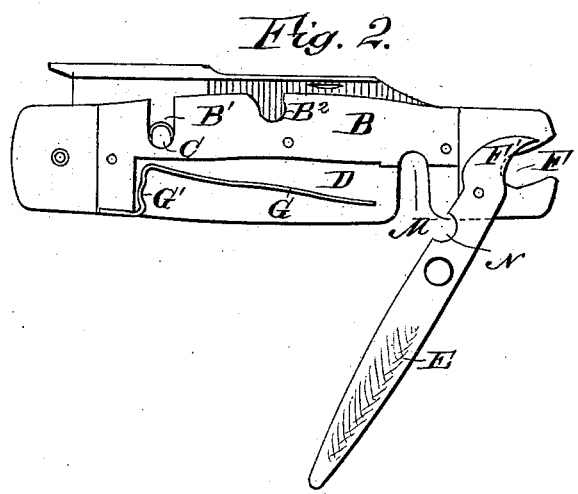
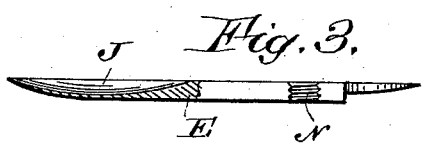
WITNESSES:
INVENTOR:
G. Freund
BY
ATTORNEYS.

UNITED STATES PATENT OFFICE.

GEORGE FREUND, OF DURANGO, COLORADO.

POCKET-KNIFE.

SPECIFICATION forming part of Letters Patent No. 297,375, dated April 22, 1884.

Application filed December 27, 1883. (No model.)

*To all whom it may concern:*

Be it known that I, GEORGE FREUND, of Durango, in the county of La Plata and State of Colorado, have invented a new and Improved Miner's Knife, of which the following is a full, clear, and exact description.

The object of my invention is to provide a new and improved knife for miners' use, to facilitate the cutting and capping of a fuse, and for other similar purposes.

The invention consists in a knife having a notch in the handle-case, and a notch on the blade, the latter notch having a screw-thread formed on its bottom to press a screw-thread in the end of a fuse placed in the notch in the handle.

The invention also consists in a blade pivoted to the case and forming a pair of pliers, which latter blade is thrown outward by a spring; also adapted to hold the blade folded or closed.

Reference is to be had to the accompanying drawings, forming part of this specification, in which similar letters of reference indicate corresponding parts in all the figures.

Figure 1 is a longitudinal elevation of my improved miner's knife, showing the cutting-blade opened. Fig. 2 is a longitudinal elevation of the same, showing the spoon-blade opened. Fig. 3 is a longitudinal sectional view of the spoon-blade.

A blade, A, pivoted in a handle-case, B, is provided with a thickened part, A', at the pivoted end, which thickened part is provided with a transverse U-shaped recess or notch, C, in which a screw-thread is cut. The handle-case B is provided with two notches, B' and B², of which the former, which is near the end of the handle-case, is deeper than the latter. If a fuse is to be cut, it is placed in the notch B², and the blade A is folded down into the case and cuts off the fuse. The end of the fuse is then placed in the notch B', after the blade A has been raised, and then the blade is pressed down, and thereby a thread will be pressed into the end of the fuse, and a cap provided with a screw-thread can be screwed on the end of the fuse.

The handle-case B is provided in one side with a recess, D, in which a blade, E, can be folded, which blade is pivoted to the handle-case near one end, the said end of the handle-case being provided with a notch, F, forming a fork.

The blade E is provided with a cutting-edge, F', beyond the pivot, whereby a pair of nippers will be formed on the knife-case, which nippers are to be used to cut the fuse. The blade E has its inner side hollowed out, as shown at J, to form a spoon for digging out a giant-powder candle to receive the fuse. The blade E is thrown outward by an L-shaped spring, G, having a notch, G', in its short shank, into which notch the end of the blade E can be pressed to hold the said blade in the recess in the handle-case, as shown in Fig. 1. The handle-case is provided with a notch, M, and the blade E with a notch, N, which notch N is screw-threaded, so that if the end of a fuse is placed in the notch M, and the blade E is pressed against the handle, a screw-thread will be pressed into the fuse.

Having thus described my invention, I claim as new and desire to secure by Letters Patent—

1. In a knife, the combination, with a knife-handle case having a notch, of a pivoted blade having a notch in which a screw-thread is cut, substantially as herein shown and described.

2. In a knife, the combination, with the handle-case B, having notches B² B', of a pivoted blade having a notch, C, in which a screw-thread is cut, substantially as herein shown and described.

3. In a knife, the combination, with the handle-case B, having a forked end, of a knife pivoted to the case, and having a projection beyond the pivot, thereby forming pliers to cut a fuse, substantially as herein shown and described.

4. In a knife, the combination, with the knife-case B, having a recess, D, of the pivoted blade E, adapted to swing into the recess, and of the spring G, for throwing the blade E outward, substantially as herein shown and described.

5. In a knife, the combination, with the knife-case B, having a recess, D, of the pivoted blade E, and the L-shaped spring G, having a notch. G', in its short shank, substantially as herein shown and described.

6. The combination, with a knife-handle case, provided with a notch, M, of a blade having one side recessed to form a spoon-blade for digging out giant-powder candles, and a screw-threaded notch, N, in its edge, substantially as herein shown and described.

GEORGE FREUND.

Witnesses:
J. E. MENSER,
GEO. W. MELVILLE.